US 6,557,240 B1

(12) United States Patent
Voights

(10) Patent No.: US 6,557,240 B1
(45) Date of Patent: May 6, 2003

(54) METHOD FOR ASSEMBLING A DISK DRIVE WITH AN INTEGRATED FILTER

(75) Inventor: Ronald L. Voights, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/798,415

(22) Filed: Mar. 2, 2001

Related U.S. Application Data

(63) Continuation of application No. 09/330,484, filed on Jun. 11, 1999, now Pat. No. 6,266,208.

(51) Int. Cl.⁷ .............................................. G11B 5/127
(52) U.S. Cl. ................... 29/603.03; 29/603.01
(58) Field of Search ........................ 29/603.03, 603.01, 29/830; 360/97.02, 97.03, 97.04

(56) References Cited

U.S. PATENT DOCUMENTS 4,329,722 A * 5/1982 West .......................... 360/133
4,418,369 A * 11/1983 Applequist et al. ...... 360/97.03
4,633,349 A 12/1986 Beck et al. .................... 360/97
4,857,087 A * 8/1989 Bolton et al. ............. 360/97.02
4,885,652 A 12/1989 Leonard et al. ............. 360/133
5,025,337 A 6/1991 Brooks ..................... 360/97.03
5,307,222 A * 4/1994 Dion ........................ 360/97.02
5,367,417 A * 11/1994 Brown et al. ............ 360/97.02
5,406,431 A 4/1995 Beecroft ................. 360/97.02
5,447,695 A 9/1995 Brown et al. ................ 422/171
5,455,728 A 10/1995 Edwards et al. ............ 360/105
5,539,595 A * 7/1996 Beck et al. ............. 360/97.01
5,602,700 A 2/1997 Viskochil et al. ........... 360/105
5,764,435 A 6/1998 Sugimoto et al. ......... 360/97.02
5,869,009 A * 2/1999 Bellefeuille et al. ........ 422/171

* cited by examiner

Primary Examiner—Carl J. Arbes
Assistant Examiner—Thiem D Phan
(74) Attorney, Agent, or Firm—David M. Sigmond

(57) ABSTRACT

An integrated filter for a disk drive includes a recirculation filter, a chemical filter, and a breather filter within a single filter cartridge. The filter are mounted within a support structure that is adapted for easy insertion into a disk drive. The support structure includes a base portion that fits within a recessed pocket in a baseplate of the disk drive. The disk drive includes structures for channeling air flow into the integrated filter structure during disk drive operation.

21 Claims, 8 Drawing Sheets

VIEW VIII-VIII

METHOD FOR ASSEMBLING A DISK DRIVE WITH AN INTEGRATED FILTER

CROSS-REFERENCE TO RELATED APPLICATIONS

This application is a continuation of U.S. application Ser. No. 09/330,484, filed Jun. 11, 1999 now U.S. Pat. No. 6,266,208.

FIELD OF THE INVENTION

The invention relates generally to disk based data storage systems and, more particularly, to filter structures for use therein.

BACKGROUND OF THE INVENTION

A disk drive is a data storage device that stores data in concentric tracks on a disk shaped medium. Data is read from the medium by spinning the medium about a central axis while positioning a transducer near a desired track of the medium to sense the data. The transducer provides an electrical signal representative of the sensed data to data processing circuitry within the disk drive which converts the electrical signal to a format that is recognizable by an attached host unit. The converted data signal is then delivered to the host unit for use thereby. Disk drives can store data in any of a number of different forms, such as magnetic data storage and optical data storage.

Disk drive units are normally enclosed within a housing to protect the workings of the drive from the exterior environment. As can be appreciated, any undesirable substances that exist within the disk drive housing can have a deleterious effect on the operation thereof. For example, in a magnetic disk drive, particles and volatile gases within the drive housing can result in performance problems such as stiction between the magnetic transducer and the disk, transducer crashes, and thermal asperities. To reduce such occurrences, the level of airborne particles and gases within the disk drive should be kept low.

Therefore, there is a need for a filtering structure to reduce the levels of undesired substances within the housing of a disk drive.

SUMMARY OF THE INVENTION

The present invention relates to an integrated filter structure for use in a disk drive. The integrated filter includes a recirculation filter, a breather filter, and a chemical filter all housed within a single support structure. The recirculation filter is operative for reducing the level of airborne particles circulating within the disk drive housing. These airborne particles can include, for example, wear particles generated by friction between the transducer and the disk medium of the disk drive during start and stop operations. The breather filter is operative for trapping solid particles entering the disk drive housing from an exterior environment through a breather port in the housing. Likewise, the chemical filter is operative for absorbing undesirable gases entering the disk drive from the exterior environment. The integrated filter can also include a diffusion path for providing condensation of vapors within air entering the disk drive housing through the breather port. During disk drive manufacture, the integrated filter is inserted into the disk drive housing as a single unit, thereby reducing the number of steps required to assemble the drive.

In one embodiment of the invention, the filter elements are housed within a frame having at least two cavities. The first cavity carries the recirculation filter and the second cavity carries the chemical and breather filters. The first cavity is located above the second cavity and includes two sidewalls having inclined upper edges. The recirculation filter is attached to the upper edges of the two sidewalls forming an enclosed space within the first cavity having a single input port for receiving circulating air. Because the upper edges of the sidewalls are inclined, a relatively large recirculation filter input surface is achieved. The second cavity of the filter frame includes first and second fluid ports, the first port for communicating with an environment external to the disk drive housing and the second port for communicating with the internal chamber of the disk drive. In this manner, air flow from the exterior environment into the disk drive housing occurs through the chemical and breather filters carried by the second cavity.

In another embodiment, a frame having a single cavity is provided. The chemical filter, the breather filter, and the optional diffusion channel are disposed within the single cavity. In addition, the recirculation of the cavity. Air currents impinging upon the recirculation filter create a low-pressure condition within the cavity that draws air into the disk drive from the exterior environment through the chemical and breather filters the diffusion channel.

Preferably, the support structure of the integrated filter is shaped to conform to a recessed pocket within the baseplate. During assembly of the disk drive, the integrated filter is inserted into the pocket of the baseplate which thereafter holds the integrated filter in a fixed position. The baseplate can also include a sloped recessed portion leading to the pocket area for creating a low pressure region that channels circulating air in a lower portion of the disk drive chamber into the recirculation filter. A second recessed portion can also be provided in the baseplate on another side of the pocket to provide a low pressure region for facilitating air flow through the breather and chemical filters. After the integrated filter has been inserted into the pocket of the baseplate, the second port of the second cavity communicates directly with the second recessed portion of the baseplate.

In one embodiment, a dam structure is provided on a disk drive cover plate to increase the filtering efficiency of the integrated filter. In a typical disk drive, a gap is formed between a lower surface of the cover plate and the upper surface of the uppermost disk in the drive. The dam structure of the invention adds a dropped portion to the lower surface of the cover plate in an area near the location of the integrated filter, thus reducing the height of the gap between the cover plate and the upper disk and increasing the air pressure in this region. The increased air pressure is operative for channeling circulating air currents from the region between the upper disk and the cover plate into the recirculation filter.

DETAILED DESCRIPTION OF THE PREFERRED EMBODIMENTS

The present invention relates to an integrated filter assembly for use in a disk drive that includes a recirculation filter, a chemical filter, and a breather filter within a single cartridge. The integrated filter is easily inserted into the housing of the disk drive as a single unit, thus eliminating the need to separately insert multiple filters within the disk drive during manufacture. The integrated filter is more reliable than past filter designs because it reduces the possibility that a filter will be improperly seated within the disk drive housing during disk drive assembly. In addition, the integrated filter is capable of providing many performance advantages over filter designs of the past. For example, the integrated filter can be designed in a manner that reduces air turbulence within the disk drive, thus reducing disk flutter and transducer perturbation effects that tend to increase bit error rates (BERs). The integrated filter is also capable of achieving enhanced filtration of the internal environment of the disk drive. Preliminary testing of filter prototypes in accordance with the invention has indicated up to a 150 percent improvement in particle reduction over previous filter designs. In addition, the integrated filter is relatively simple and inexpensive to manufacture.

Figure 1:
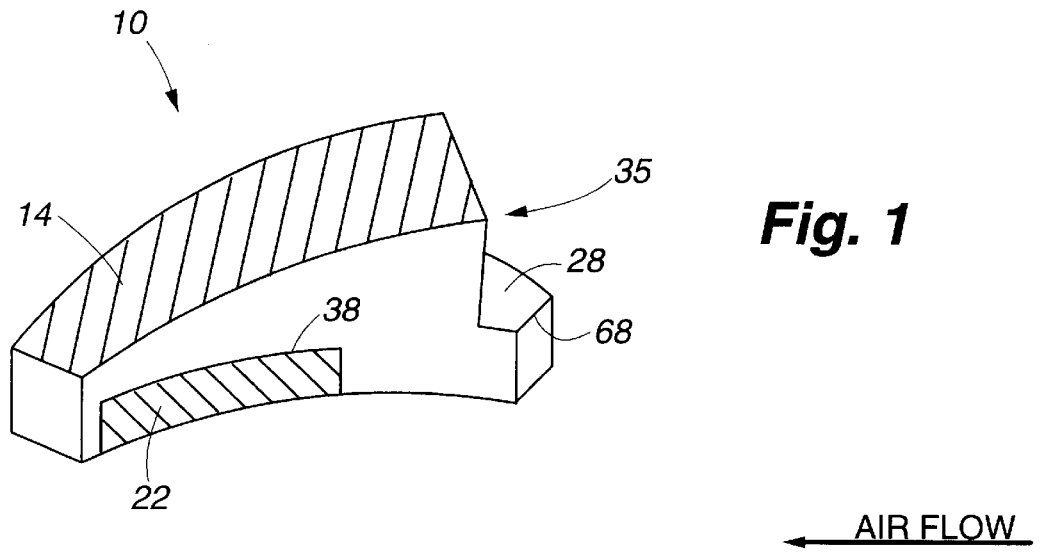
FIG. 1 is an isometric view of an integrated filter assembly in accordance with one embodiment of the present invention.
Figure 2:
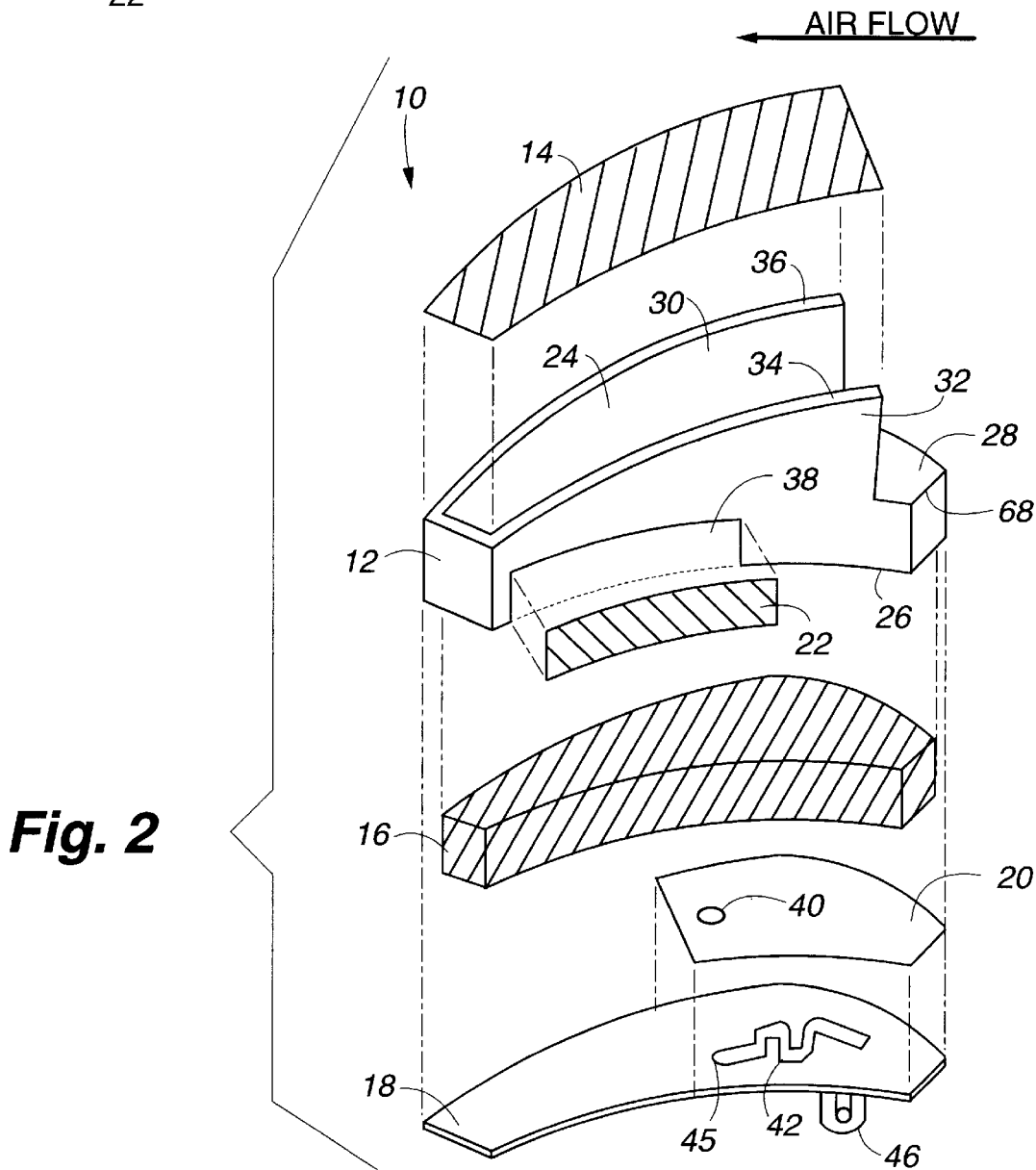
FIG. 2 is an exploded isometric view of the integrated filter assembly of FIG. 1.

FIGS. 1 and 2 are an isometric view and an exploded isometric view, respectively, of an integrated filter 10 in accordance with one embodiment of the present invention. As shown in FIG. 2, the integrated filter 10 includes: a frame 12, a recirculation filter 14, a chemical filter 16, a diffusion path plate 18 having a breather tube 46, a diffusion cover plate 20, and a breather filter 22. The frame 12 includes an upper cavity 24 and a lower cavity 26. The two cavities 24, 26 in the frame 12 are separated from one another by a floor 28 forming the lower boundary of the upper cavity 24. The upper cavity 24 is also bounded by a pair of side walls 30, 32 that define an internal volume of the cavity 24.

The recirculation filter 14 is attached to the upper edges 34, 36 of the two sidewalls 30, 32, thus enclosing the internal volume of the upper cavity 24 except for a single input port 35 (see FIG. 1). Preferably, the recirculation filter 14 is bonded to the edges 34, 36 using a technique such as ultrasonic fusion or heat fusion, although other attachment techniques can also be used. During disk drive operation, circulating air within the disk drive housing is forced into the input port 35 of the upper cavity 24. The air flows through the recirculation filter 14, which traps airborne particles within the air, and emerges from an upper surface thereof. Because the recirculation filter 14 is held at an angle, the input surface area of the filter is relatively large and thus produces very efficient filtration performance.

Figure 3:
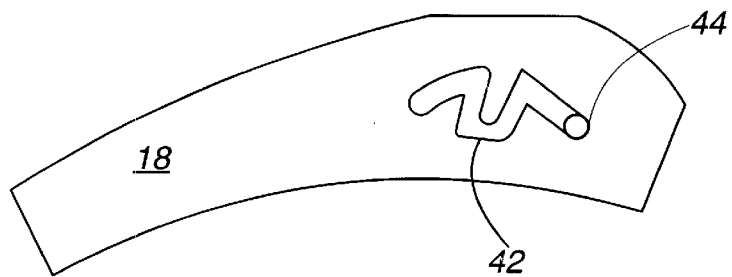
FIGS. 3 and 4 are a top and bottom view, respectively, of a diffusion path plate in accordance with the present invention.
Figure 4:
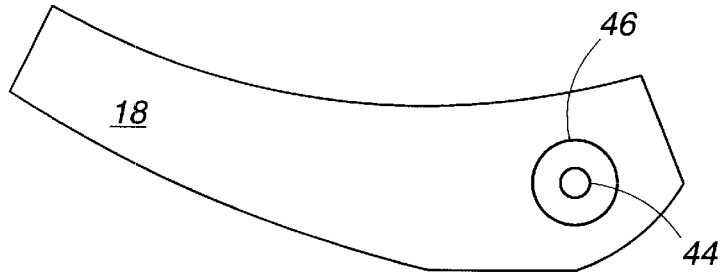
Figure 5:
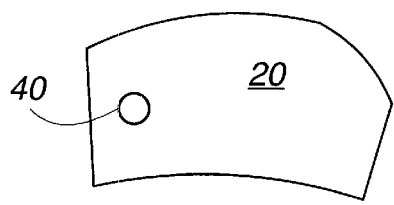
FIG. 5 is a top view of a diffusion cover plate in accordance with the present invention.

The diffusion cover plate 20 and the diffusion path plate 18 form an assembly that provides a diffusion channel within the integrated filter 10 through which air entering the disk drive from an exterior environment must pass. The diffusion channel produces condensation of vapors within the incoming air so that the vapors are not permitted to enter the internal chamber of the disk drive. FIGS. 3, 4, and 5 illustrate the diffusion path plate 18 and the diffusion cover plate 20 in greater detail. FIGS. 3 and 4 are a top and bottom view, respectively, of the diffusion path plate 18 and FIG. 5 is a top view of the diffusion cover plate 20. As illustrated, the diffusion path plate 18 includes a hollowed channel structure 42 in an upper surface thereof. The hollowed channel structure 42 includes a port 44 at one end that extends through the diffusion path plate 18, and the breather tube 46 on the underside of the plate 18, to provide a fluid flow path through the plate 18. Similarly, the diffusion cover plate 20 includes a port 45 to provide a fluid flow path through the diffusion cover plate 20. The diffusion cover plate 20 is attached to the upper surface of the diffusion path plate 18 so that the port 40 is in fluid communication with the hollowed channel structure 42. The underside of the diffusion cover plate 20 thus forms an upper boundary of the channel structure 42 thus confining fluid flow through the assembly to the diffusion channel.

Referring back to FIG. 2, the chemical filter 16 is inserted into the lower cavity 26 of the frame 12 during assembly of the integrated filter 10. The shape of the chemical filter 16 preferably conforms to the shape of the lower cavity 26 so that chemical filter 16 fills an upper portion of the cavity 26. After the chemical filter 16 has been inserted, the diffusion path plate/diffusion cover plate 18/20 assembly is inserted into the lower cavity 26 just below the chemical filter 16. The shape of the diffusion path plate 18 also conforms to the shape of the lower cavity 26 so that the underside of the chemical filter 16 is fully covered. The outer edge of the diffusion path plate 18 preferably forms a seal against the inner walls of the lower cavity 26 to prevent air flow through the junction. This seal can be provided in any of a number of ways including the use of a compression fit between the diffusion path plate 18 and the cavity walls, the use of an adhesive or sealant compound at the juncture, or by bonding the plate 18 to the walls using some other technique. Alternatively, the diffusion path plate 18 can be bonded to the lower edge of the walls of the frame 12 without being fully inserted.

The breather filter 22 is bonded within an opening 38 in a side of the frame 12 that leads into the second cavity 26. As with the recirculation filter 14, the breather filter 22 is preferably attached using ultrasonic fusion or heat fusion techniques, although other attachment techniques are also possible. During disk drive operation, air from the exterior environment enters the integrated filter 10 through the port 44 in the breather tube 46. The air then flows through the diffusion channel 42 and into the chemical filter 16 via port 40. The air then flows through the chemical filter 16 and emerges from the filter 10 through the opening 38 having the breather filter 22 affixed therein.

Figure 6:
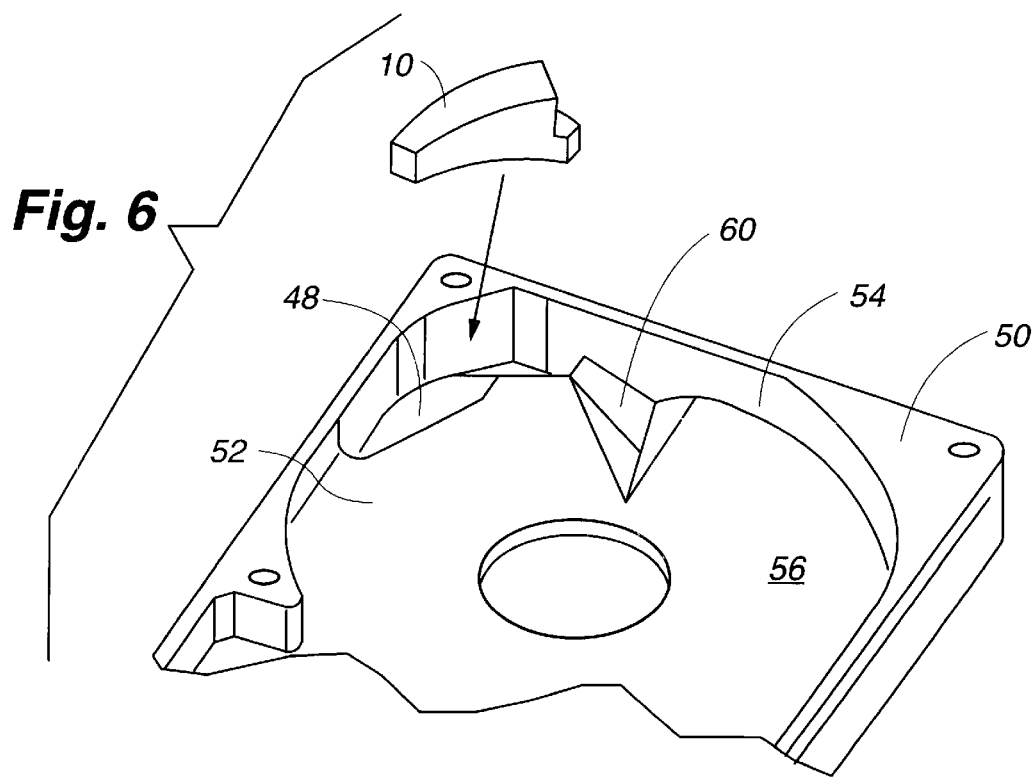
FIG. 6 is an isometric top view of a baseplate illustrating the insertion of an integrated filter in accordance with one embodiment of the present invention.

FIG. 6 is an isometric view illustrating the baseplate 50 of a disk drive into which the integrated filter 10 can be inserted. The baseplate 50 includes an internal chamber 52 into which a disk stack (not shown) and a corresponding spin motor (not shown) are installed. The internal chamber 52 is defined, at least in part, by a substantially circular shroud 54 which follows the outer periphery of the disk stack. Also defining the internal chamber 52 is a floor surface 56 which lies in a substantially horizontal plane and is parallel to the disks in the disk stack. The baseplate 50 also includes a recessed pocket 48 in a corner of the internal chamber 52 into which the integrated filter 10 is inserted. The dimensions of the pocket 48 conform to certain external dimensions of the integrated filter 10. In addition, the pocket 48 includes a breather port 57 in a floor thereof (see FIG. 7) that provides a fluid flow path between the internal chamber 52 of the disk drive and the exterior environment.

During disk drive assembly, the integrated filter 10 is inserted into the pocket 48 where it is pressed down until the underside of the filter 10 contacts the floor of the pocket 48. In a preferred embodiment, the integrated filter 10 is held in place, at least partially, by a compression fit between the frame 12 and the internal dimensions of the pocket 48. In an alternative approach, snaps or tabs are provided for holding the filter 10 in place within the pocket 48. Other approaches for securing the filter 10 in place within the pocket 48, such as the use of adhesives, can also be used. When the integrated filter 10 is properly installed, the breather tube 46 on the lower surface of the filter 10 fits within the breather port 57 in the floor of the pocket 48 to provide fluid communication between the exterior environment and the inside of the second cavity 26 of the frame 12. Because it is important that nearly all of the air flowing into the disk drive from the exterior environment travel through the filters within the second cavity 26 of the frame 12, the seal between the breather tube 46 and the breather port 57 should be relatively tight. Thus, a sealing device, such as an O-ring, may be provided.

Figure 7:
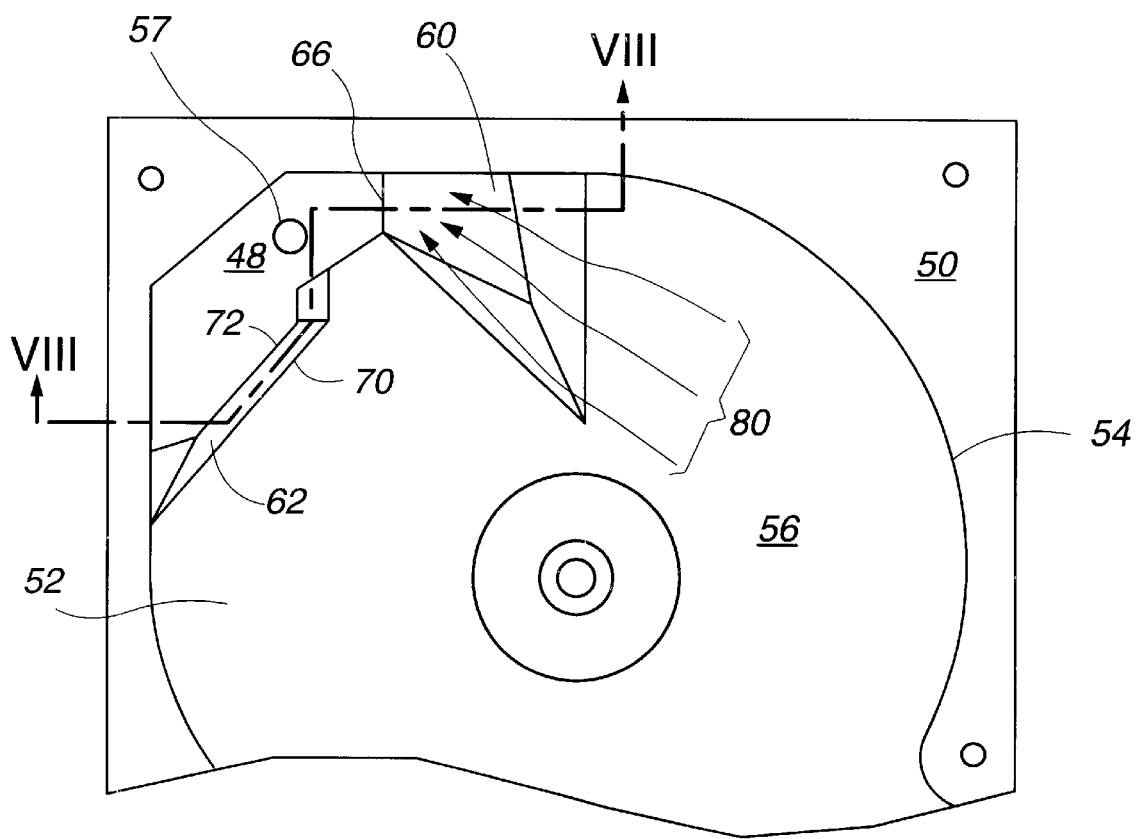
FIG. 7 is a simplified top view of the baseplate of FIG. 6 illustrating the air flow down a first recessed ramp portion thereof.
Figure 8:
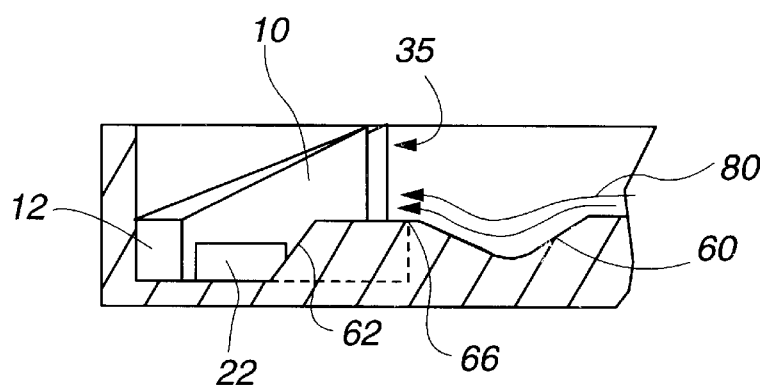
FIG. 8 is a simplified cross-sectional side view illustrating air flow patterns within a disk drive in one embodiment of the present invention.

The region between the lowermost disk in the disk stack and the surface 56 of the baseplate 50 has historically been one of the most contaminant laden portions the internal disk drive environment. This is supported by the fact that, in the past, head crashes, thermal asperities, and disk stiction problems occurred a disproportionate amount of the time on the lower surface of the lowermost disk in the drive. Until now, methods for dealing with these disproportionate contaminant levels have been inadequate. In accordance with the present invention, this region can be filtered so that contaminant levels in the area are more in line with other areas of the internal chamber 52 of the disk drive. FIG. 7 is a simplified top view of the baseplate 50 illustrating a first recessed portion 60 within the baseplate 50 that is operative for channeling air currents 80 traveling between the lowermost disk and the surface 56 of the baseplate 50 into the input port 35 of the integrated filter 10. The first recessed portion 60 comprises a depression in the baseplate surface 56 that gradually declines from the surface 56 (in the direction of air flow 80) and then inclines up to an edge 66 at the border of the pocket 48. In another embodiment of the invention, the first recessed portion 60 includes only a decline from the surface 56 and the edge 66 is substantially lower than the surface 56. FIG. 8 is a sectional side view of the filter region of the baseplate 50 showing the air flow patterns of the air just above the baseplate surface 56. As shown in FIGS. 7 and 8, the initial decline in the first recessed portion 60 increases the air volume in the region and thus generates a low-pressure zone which draws the circulating air outward and downward. The air then rises up the incline area of the first recessed portion 60 toward the edge 66. When the integrated filter 10 is inserted into the pocket 48, an edge 68 of the frame 12 (see FIG. 1) lines up with the edge 66 so that the air currents 80 flow into the input port 35 of the filter 10. Preferably, the elevation of the edge 66 of the baseplate 50 is equal to the elevation of the floor 28 of the installed filter 10. Because the first recessed portion 60 uses gradual slopes, very little air turbulence is created.

As shown in FIG. 7, the baseplate 50 also includes a second recessed portion 62 that is adjacent to the pocket 48. The second recessed portion 62 also creates a low pressure zone due to an increased volume and the rotating disks. This low pressure zone is operative for drawing air into the disk drive housing from the exterior environment through the breather port 57 in the baseplate and thus through the chemical and breather filters 16, 22 and the diffusion channel 42. This drawing of external air through the integrated filter 10 reduces the likelihood that air will be drawn into the disk drive housing through unfiltered leakage paths when pressure differentials exist between internal and external environments. The second recessed portion 62, as shown in FIG. 7 and 8, includes a gradual incline starting at edge 72 and ending at edge 70.

During operation of the disk drive, the disks in the disk stack (or the sole disk in a single disk system) rotate about a central axis within the internal chamber 52 of the disk drive. To provide data transfer between the one of the disks and an external host system, a transducer is positioned near a predetermined track of the rotating disk and an information transfer is initiated. The rotation of the disks creates circumferential air currents within the internal chamber 52 of the disk drive in the direction of disk rotation. These air currents exist between individual disk pairs, between the upper surface of the uppermost disk and the cover plate of the disk drive, and between the lower surface of the lowermost disk and the floor surface 56 of the baseplate 50. In areas where the disks are surrounded by the shroud 54, the air currents are predominantly contained within the disk region. However, as the air currents approach the integrated filter region, they are drawn outward toward the filter input port 35 due to a lower pressure in the filter region. Much of this air is channeled into the input port 35 of the integrated filter 10 where it passes through the recirculation filter 14 which removes airborne particles from the air. The resulting "clean" air then emerges from the rear portion of the recirculation filter 14 and continues to circulate within the drive.

As discussed earlier, the chemical and breather filters 16, 22 are used primarily during periods when pressure differences exist between the internal chamber 52 of the disk drive and the exterior environment. For example, when the disk drive is brought from a high altitude to a low altitude in a relatively short time period, the increased pressure at the low altitude will cause air to flow into the disk drive through the breather port 57. Likewise, an increase in temperature within the disk drive will cause an increase in pressure which will result in a flow of air out of the disk drive through the breather port 57. Because the breather port 57 is available as a relatively low pressure path for air flow, air flow through other undesired paths (e.g., leakage paths) is minimized. The integrated filter 10 of the present invention ensures that air entering the disk drive housing from the exterior environment due to pressure differentials (or other reasons) is filtered of airborne particles and undesirable gases and vapor before it reaches the internal chamber 52.

Air entering the disk drive through the breather port 57 first passes through the diffusion channel 42 within the diffusion path plate/diffusion cover assembly 18/20 of the integrated filter. As described above, the diffusion channel 42 allows vapors within the incoming air to condensate before the air reaches the internal chamber 52. The air next enters the chemical filter 16 which removes potentially harmful chemicals from the air, such as volatile gases that can cause damage within the disk drive. The chemical filter 16 can also include a desiccant for removing any residual water vapor from the incoming air that was not condensed in the diffusion channel 42. The air flows through the chemical filter 16 and exits the integrated filter 10 through the breather filter 22 and into the second recessed portion 62. The clean air then travels up the incline of the second recessed portion 62 and into the internal chamber 52 of the disk drive.

Figure 9:
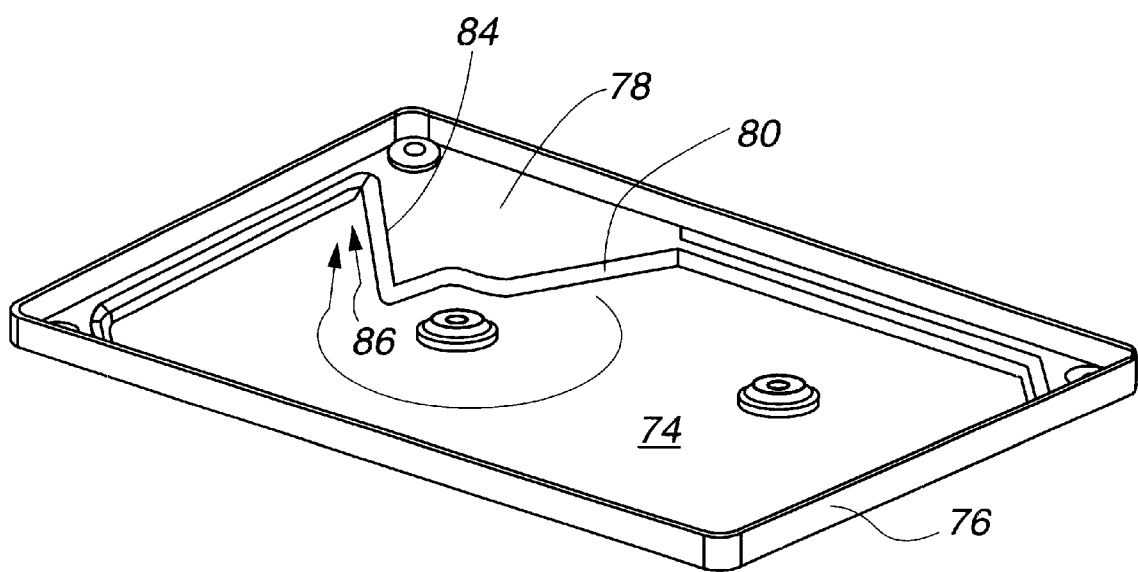
FIG. 9 is an isometric view of a cover plate in accordance with one embodiment of the present invention.

As described above, the region between the lowermost disk of the disk stack and the surface 56 of the baseplate 50 has historically been one of the most contaminant laden areas of the internal chamber of disk drives. This is because prior disk drive filtration methods have been inadequate for filtering air currents generated within this region. The region between the uppermost disk of the disk stack and the cover plate of the disk drive suffers from similar filtration problems. In accordance with one embodiment of the present invention, a dam structure is provided in the cover plate of the disk drive for generating a high pressure ridge between the cover plate and the upper disk which channels the circulating air outward and into the input port 35 of the integrated filter 10. FIG. 9 is a isometric view of the bottom surface 74 of a cover plate 76 having such a dam structure 78. The dam structure 78 is a dropped portion of the surface 74 that is connected to the remainder of the surface 74 by a border ramp 80. The dam structure 78 is located in a corner of the cover plate 76 corresponding to the location of the integrated filter. The dam structure 78 includes a diagonal edge 84 which creates a diagonal pressure ridge which forms a barrier to circumferential air flow above the upper disk. Thus, the circulating air is channeled outward in a direction 86 and flows over the edge of the upper disk and down into the input port 35 of the integrated filter 10.

Figure 10:
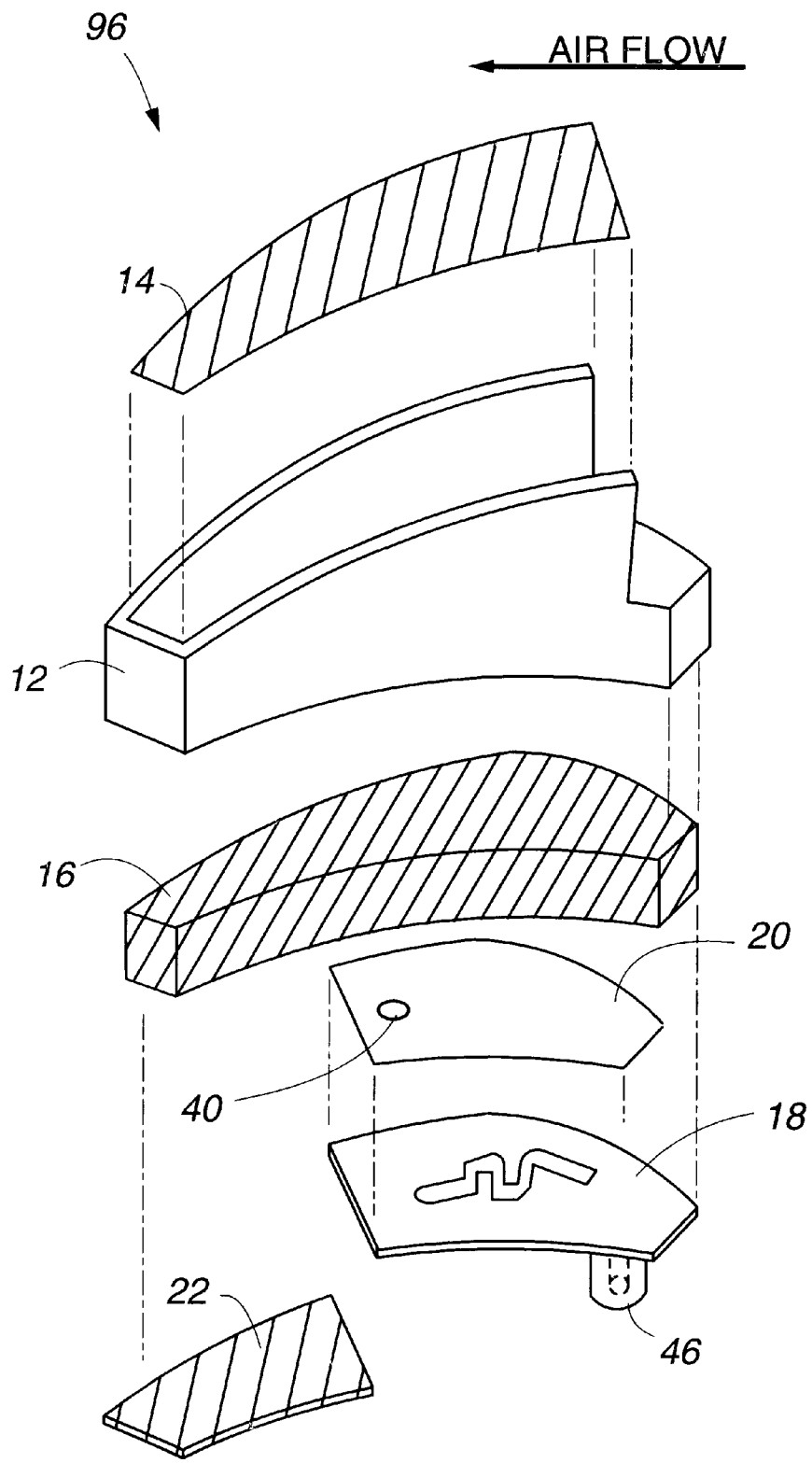
FIG. 10 is an exploded isometric view of an integrated filter assembly in accordance with another embodiment of the present invention.

FIG. 10 is an exploded isometric view of an integrated filter 96 in accordance with another embodiment of the present invention. The same reference numerals are used in FIG. 10 that were used in FIG. 2 to describe similar functionality. As shown, the integrated filter 96 includes: a frame 12, a recirculation filter 14, a chemical filter 16, a diffusion path plate 18, a diffusion cover plate 20, and a breather filter 22. The breather filter 22 is bonded across half of the lower opening in the frame 12 (instead of an opening in a side of the frame 12). Accordingly, the diffusion path plate 18 is only one-half the size of the previous embodiment and covers the other half of the lower opening. Therefore, air passing into the disk drive from the exterior environment first passes through the diffusion channel within the diffusion path plate/cover plate 18, 20 assembly, then through the chemical filter 16, and then through the breather filter 22 to emerge from the underside of the filter 96. The air then travels up the incline of the second recessed portion 62 into the internal chamber 52 of the disk drive. An additional depression within the pocket 48 in the area directly beneath the breather element 22 may be provided to facilitate air flow from the breather filter 22 into the disk drive chamber.

Figure 11:
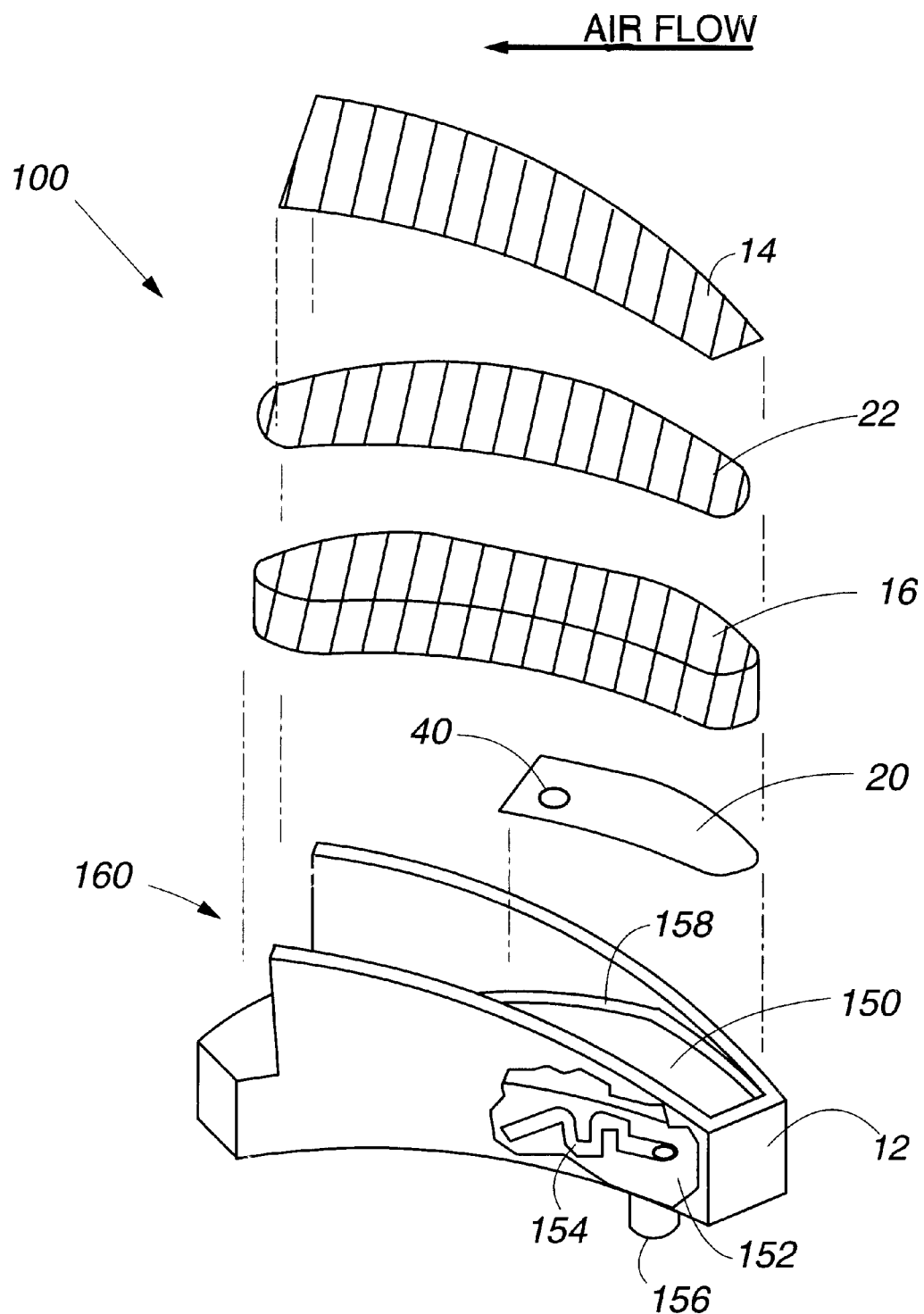
FIG. 11 is an exploded isometric view of an integrated filter assembly in accordance with yet another embodiment of the present invention.

FIG. 11 is an exploded isometric view of an integrated filter 100 in accordance with yet another embodiment of the present invention. The integrated filter 100 includes a frame 12, a recirculation filter 14, a chemical filter 16, a diffusion cover plate 20, and a breather filter 22. The frame 12 includes a single cavity 150 having a floor 152. The floor 152 includes a diffusion channel 154 that is in fluid communication with a breather tube 156 protruding from a bottom of the frame 12. The diffusion cover plate 20 is bonded to the floor 152 in an area above the diffusion channel 154 to form an upper boundary of the channel 154. The diffusion cover plate 20 includes a port 40 which overlaps a portion of the diffusion channel 154 to provide fluid communication between the diffusion channel 154 and the cavity 150. In an alternate embodiment, the diffusion channel 154 is located on the under surface of the frame 12 and the diffusion cover plate 20 is bonded thereon.

The chemical filter 16 is inserted into the cavity 150 where it rests just above the diffusion cover plate 20. The breather filter 22 is then bonded to a ledge 158 within the cavity 150. The recirculation filter 14 is bonded to the inclined upper edges 34, 36 of the sidewalls 30, 32 of the frame 12, as in the previous embodiments. As before, the integrated filter 100 is inserted into a pocket within the baseplate of a disk drive during disk drive assembly. When properly inserted, the breather tube 156 fits into a breather port in the baseplate pocket which is in fluid communication with the exterior environment.

As illustrated, the configuration of the integrated filter 100 of FIG. 11 is reversed as compared to the prior filter embodiments. That is, instead of the circulating air flowing into a bottom surface of the recirculation filter 14 and emerging from the upper surface thereof, the air currents in this embodiment flow into the recirculation filter 14 through the upper surface and emerge from the lower surface thereof. The recirculation filter 14 impedes the air stream, thus creating a low-pressure region between the recirculation filter 14 and the breather filter 22. This low-pressure region draws air into the disk drive housing through the diffusion channel 154, the chemical filter 16, and the breather filter element 22. The air drawn in from the exterior environment, as well as the air flowing through the recirculation filter 14, exits the integrated filter 100 through port 160.

Figure 12:
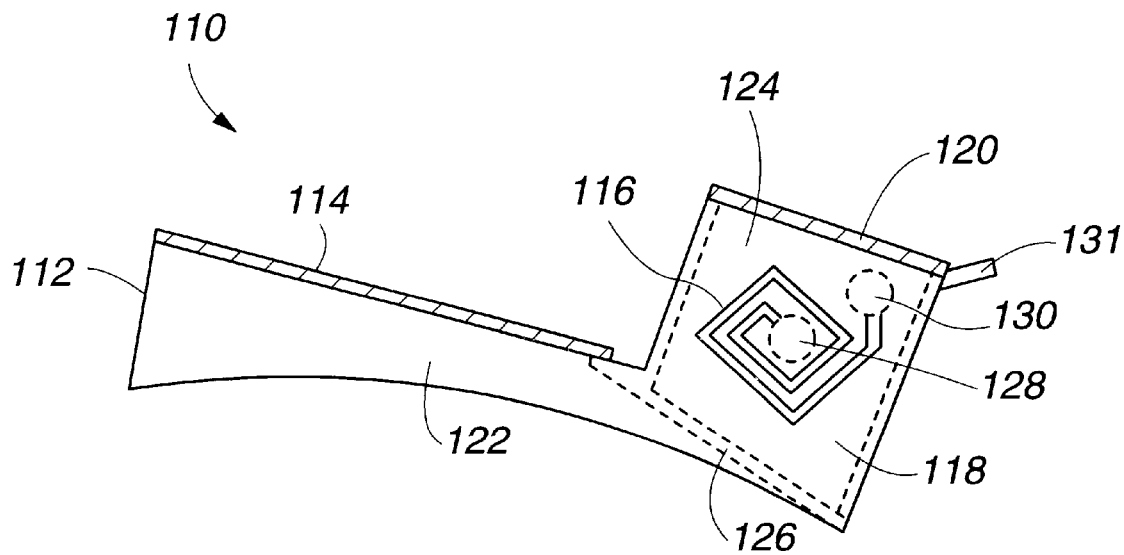
FIGS. 12 and 13 illustrate an integrated filter in accordance with yet another embodiment of the present invention.
Figure 13:
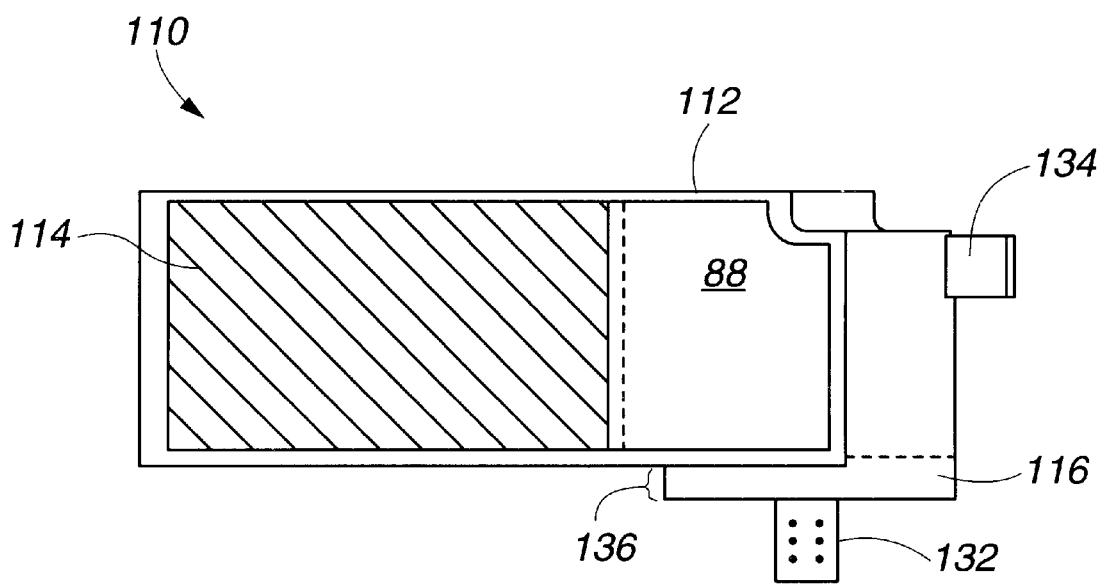
Figure 14:
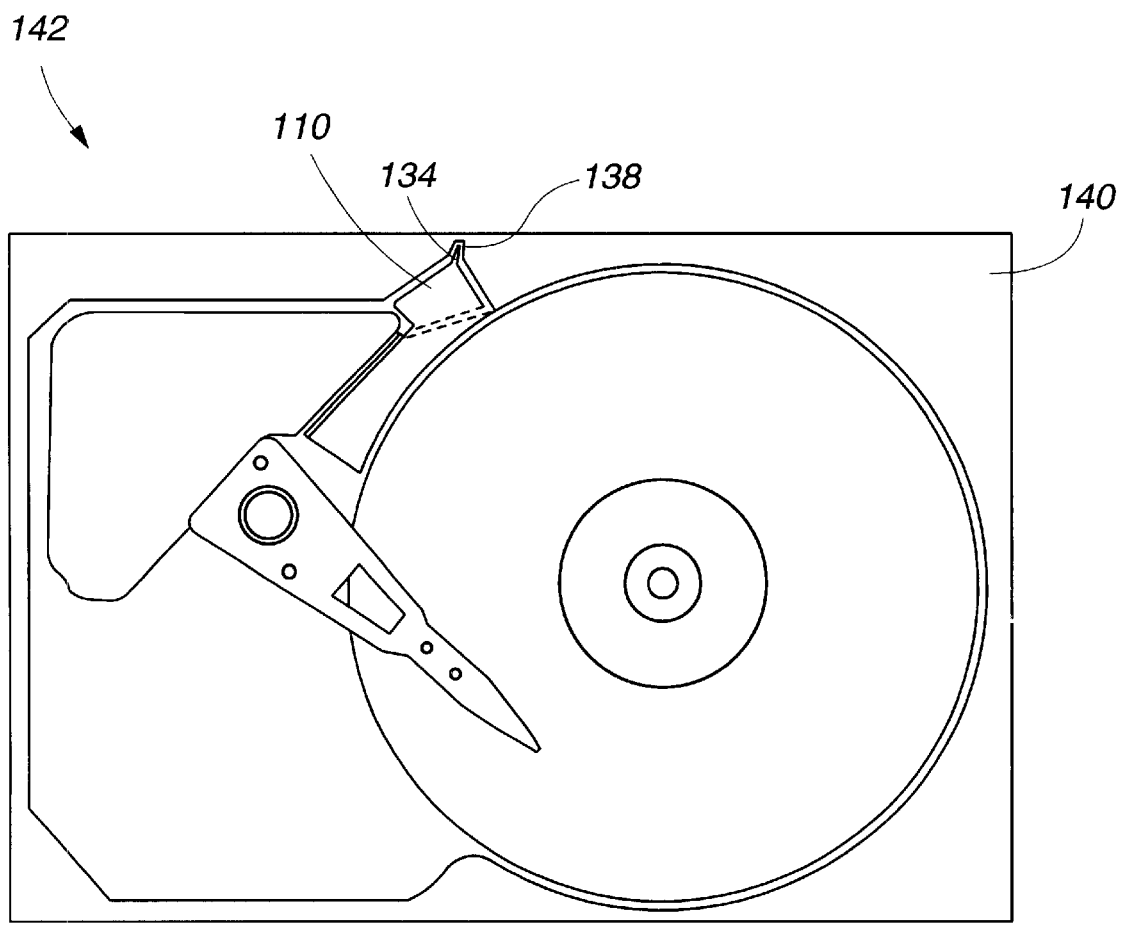
FIG. 14 is a top view of a disk drive illustrating the positioning of the integrated filter of FIGS. 12 and 13 in one embodiment of the present invention.

FIGS. 12 and 13 illustrate an integrated filter 110 in accordance with still another embodiment of the present invention. FIG. 14 illustrates the integrated filter 110 inserted within the housing of a disk drive 142. With reference to FIG. 12, the integrated filter 110 includes a recirculation filter 114, a diffusion channel 116, a chemical filter 118, and a breather filter 120. The filters are housed within a frame 112 having a first cavity 122 and a second cavity 124. The first cavity 122 has the recirculation filter 114 disposed across an opening thereof. The second cavity 124 is separated from the first cavity 122 by a wall 126 and holds the diffusion channel 116, the chemical filter 118, and the breather filter 120.

The diffusion channel 116 is similar to the diffusion path plate assembly discussed above. As shown in FIG. 13, the diffusion channel 116 is located near the bottom of the second cavity 124. With reference to FIGS. 12 and 13, a first port 128 of the diffusion channel 116 couples downward through a breather tube 132 which emerges from the bottom of the frame 112. During disk drive assembly, this tube 132 is inserted within a breather port in the floor of the baseplate 140 that is in fluid communication with the exterior environment. Air flow entering the first port 128 through the tube 132 travels through the diffusion channel 116 and emerges from the second port 130 into an upper portion of the second cavity 124.

The upper portion of the second cavity 124 includes the chemical filter 118. Thus, the air exiting the second port 130 of the diffusion channel 116 next flows through the chemical filter 118. The breather filter 120 is disposed across an opening of the second cavity 124. Thus, after the incoming air is processed by the chemical filter 118 it flows through the breathe filter 120 into the internal cavity of the disk drive 142.

With reference to FIG. 13, the frame 112 of the integrated filter 110 includes a base portion 136 which is shaped for insertion into a pocket in the baseplate 140 during disk drive assembly. The pocket in the baseplate 140 includes the breather port discussed above. The frame 112 also includes a tab 134 which fits within a slot 138 in a wall of the baseplate 140 for providing additional support to the filter 110. The disk drive cover plate (not shown) contacts the upper surface of the filter 110 to hold the filter in place during disk drive operation.

Although the present invention has been described in conjunction with its preferred embodiments, it is to be understood that modifications and variations may be resorted to without departing from the spirit and scope of the invention as those skilled in the art readily understand. For example, the shape and element location within the disclosed integrated filter embodiments are not intended to limit the invention in any way. In addition, a single element can be used in accordance with the invention to perform both chemical and breather filtration in the disk drive. Such modifications and variations are considered to be within the purview and scope of the invention and the appended claims.

What is claimed is:

1. A method for assembling a disk drive with an integrated filter, comprising the steps of:
   manufacturing an integrated filter, including
      providing a frame having a first cavity and a second cavity;
      attaching a recirculation filter to said first cavity so that air flowing into said first cavity flows through said recirculation filter;
      inserting a chemical filter into said second cavity; and
      positioning a breather filter adjacent to an opening of said second cavity so that air traversing said opening flows through said breather filter; then
   coupling said integrated filter to a baseplate, wherein said baseplate is coupled to a spin motor; and then
   coupling a cover plate to said baseplate.

2. The method, as claimed in claim 1, wherein:
   said first cavity includes two sidewalls having sloped upper edges, wherein said step of attaching includes attaching said recirculation filter to the upper edges of said sidewalls.

3. The method, as claimed in claim 2, wherein:
   said step of attaching includes using at least one of ultrasonic fusion and heat fusion.

4. The method, as claimed in claim 1, wherein:
   said step of positioning includes attaching said breather filter across said opening of said second cavity.

5. The method, as claimed in claim 1, wherein:
   said step of providing includes having said first cavity situated above said second cavity and separated from said second cavity by a non-porous floor member.

6. The method, as claimed in claim 1, wherein:
   said step of manufacturing includes coupling a diffusion path to said second cavity of said frame, said diffusion path including an input port, an output port, and an internal diffusion channel connecting said input port and said output port, wherein said diffusion path is coupled so that air flowing through said second cavity also flows through said diffusion path.

7. A method for assembling a disk drive, comprising the steps of:
   providing a baseplate having a recessed pocket portion, wherein said baseplate is coupled to a spin motor;
   providing an integrated filter having a recirculation filter, a breather filter, and a chemical filter coupled to a frame having a portion that is shaped to correspond to a shape of said recessed pocket portion;
   inserting said integrated filter into said recessed pocket portion; and then
   attaching a cover plate to said baseplate.

8. The method, as claimed in claim 7, wherein:
   said recessed pocket portion includes a breather port providing a fluid communication path between an internal chamber of said disk drive and an exterior environment and said integrated filter includes a port through which air can enter said integrated filter, wherein said step of inserting includes aligning said port of said integrated filter with said breather port of said baseplate.

9. The method, as claimed in claim 7, wherein:
   said recessed pocket portion is located proximate to a corner of said baseplate.

10. The method, as claimed in claim 7, wherein:
    said integrated filter includes first and second cavities, said recirculation filter is disposed in said first cavity, and said breather filter and chemical filter are disposed in said second cavity.

11. A method for assembling a disk drive, comprising the steps of; providing an integrated filter having a frame, a recirculation filter, a breather filter and a chemical filter, wherein said frame is coupled to said recirculation filter, said breather filter and said chemical filter, said frame includes an insertion portion, said recirculation filter is adapted for trapping solid particles circulating within said disk drive, said breather filter is adapted for trapping solid particles entering said disk drive from an exterior environment, and said chemical filter is adapted for absorbing undesired vapors entering said disk drive from said exterior environment;
    providing a baseplate having a receiving portion shaped to conform with said insertion portion, wherein said baseplate is coupled to a spin motor;
    inserting said integrated filter into said baseplate by inserting said insertion portion into said receiving portion; and then
    attaching a cover plate to said baseplate.

12. The method, as claimed in claim 11, wherein:
    said receiving portion is a recessed portion of said baseplate.

13. The method, as claimed in claim 12, wherein:
    said recessed portion is located proximate to a corner of said baseplate.

14. The method, as claimed in claim 11, wherein:
    said breather filter is in fluid communication with a breather port in a floor of said baseplate, and said breather port is in fluid communication with air in said exterior environment.

15. The method, as claimed in claim 14, wherein:
    said integrated filter includes a diffusion channel, said chemical filter is disposed between and in fluid com munication with said breather filter and said diffusion channel, and said diffusion channel is disposed between and in fluid communication with said chemical filter and said breather port.

16. The method, as claimed in claim 11, wherein:

said integrated filter is located in a corner of said baseplate immediately preceding, with respect to a direction of rotation of a disk in said disk drive, a pivot point of an actuator arm in said disk drive.

17. The method, as claimed in claim 11, wherein:

said baseplate includes a recessed portion for creating a low pressure region in a vicinity adjacent to said integrated filter to facilitate the passage of air into said disk drive through said breather and chemical filters.

18. The method, as claimed in claim 11, wherein:

said cover plate includes a first planar portion and a second planar portion, said second planar portion is situated above said integrated filter and is horizontally offset from and extends below said first planar portion, and said second planar portion channels air currents generated in a gap between an uppermost disk in said disk drive and said cover plate into said recirculation filter.

19. The method, as claimed in claim 11, wherein:

said frame includes first and second cavities, said recirculation filter is disposed in said first cavity, and said breather filter and chemical filter are disposed in said second cavity.

20. The method, as claimed in claim 19, wherein:

said frame includes two sidewalls rising in a predominantly vertical direction with respect to a horizontal plane and said two sidewalls each include an upper edge that is inclined with respect to said horizontal plane; and said recirculation filter is attached to said upper edges of said two sidewalls and covers said first cavity.

21. A method for assembling a disk drive with an integrated filter, comprising the steps of:

manufacturing an integrated filter, including providing a frame having a first cavity and a second cavity, wherein said first cavity is situated above said second cavity and separated from said second cavity by a non-porous floor member;

attaching a recirculation filter to said first cavity so that air flowing into said first cavity flows through said recirculation filter, inserting a chemical filter into said second cavity; and positioning a breather filter adjacent to an opening of said second cavity so that air traversing said opening flows through said breather filter; then coupling said integrated filter to a baseplate; and then coupling a cover plate to said baseplate.

* * * * *